UNITED STATES PATENT OFFICE.

ALLAN J. FIELD, OF NEW YORK, N. Y.

MONOAZO DYESTUFF.

1,383,711.  Specification of Letters Patent.  Patented July 5, 1921.

No Drawing.  Application filed July 23, 1918. Serial No. 246,319.

*To all whom it may concern:*

Be it known that I, ALLAN JAMES FIELD, a subject of the King of Great Britain, residing in New York city, borough of Manhattan, State of New York, have invented certain new and useful Improvements in the Monoazo Dyestuffs, of which this is a full, clear, and exact specification.

This invention relates to improvements in dyestuffs, and to processes of producing the same.

By the present invention I produce a new bluish red azo coloring-matter of the formula:

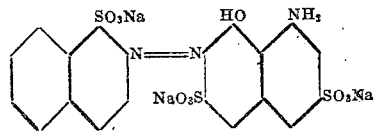

and have discovered that the same may be produced by the combination of diazotized 2-naphthylamin-1-sulfonic acid with 1:8 amidonaphthol-3:6 disulfonic acid (H acid).

Example: Dissolve about two hundred and twenty-three (223) parts of 2-naphthylamin-1-sulfonic acid in about one thousand (1000) parts of water and one hundred and eighty-two and one-half (182.5) parts of sodium hydrate containing thirty-five per cent. NaOH. To this add a solution of seventy-four and one-half (74.5) parts sodium nitrite containing ninety-five per cent. $NaNO_2$, dissolved in about one hundred and forty-five (145) parts of water. The mixed solutions are cooled to 5° C. with ice. This cold liquid is then run into three hundred and fifty-three (353) parts of hydrochloric acid containing thirty-one per cent. HCl, cooled to 10° C. with an equal amount of ice and water. Stir well while mixing and continue stirring for about 10 minutes; the diazo compound separates out as a light reddish yellow precipitate.

The diazo compound is then run into an ice cold solution of about three hundred and nineteen and one-half (319.5) parts of 1:8 amidonaphthol-3:6-disulfonic acid (H acid) of one hundred per cent. strength in seven hundred (700) parts of water and five hundred and sixty (560) parts of sodium hydrate containing thirty-five per cent. NaOH.

The dyestuff is formed instantly and can be precipitated out of solution with common salt. The dry dyestuff forms a dark powder with a metallic copper-like luster. It is easily soluble in water with bluish-red color. When dissolved in sulfuric acid a deep violet-blue solution results. It is soluble in alcohol with a bluish-red color. It is not soluble in benzene. The new dyestuff dyes silk or wool in an acid bath of bluish-red shade similar to that of azo-fuchsin.

What I claim as my invention, and desire to secure by Letters Patent is:—

As new product, the dyestuff having the formula:

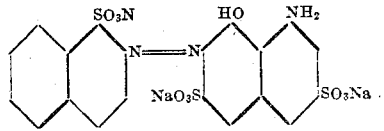

obtained by combining diazotized 2-naphthylamin-1-sulfonic acid with 1:8 amidonaphthol-3-6-disulfonic acid, which is readily soluble in water with a bluish-red color, dissolving in concentrated sulfuric acid with deep violet blue color, dyeing wool and silk bluish-red shade.

In witness whereof, I have hereunto signed my name.

ALLAN J. FIELD.